United States Patent
Furukawa (10) Patent No.: US 9,455,828 B2
(45) Date of Patent: Sep. 27, 2016

(54) RE-ENCRYPTION SYSTEM, RE-ENCRYPTION METHOD AND RE-ENCRYPTION PROGRAM

(71) Applicant: NEC CORPORATION, Tokyo (JP)

(72) Inventor: Jun Furukawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/421,223

(22) PCT Filed: Jul. 29, 2013

(86) PCT No.: PCT/JP2013/004576
§ 371 (c)(1),
(2) Date: Feb. 12, 2015

(87) PCT Pub. No.: WO2014/034018
PCT Pub. Date: Mar. 6, 2014

(65) Prior Publication Data
US 2015/0236850 A1    Aug. 20, 2015

(30) Foreign Application Priority Data
Aug. 30, 2012 (JP) .................................. 2012-189548

(51) Int. Cl.
H04L 29/00 (2006.01)
H04L 9/08 (2006.01)
H04L 9/30 (2006.01)

(52) U.S. Cl.
CPC .............. *H04L 9/0822* (2013.01); *H04L 9/30* (2013.01); *H04L 2209/24* (2013.01)

(58) Field of Classification Search
CPC ................... H04L 9/08; H04L 9/30

USPC .......................................................... 380/281
See application file for complete search history.

(56) References Cited

U.S. PATENT DOCUMENTS

2008/0170701 A1* 7/2008 Matsuo ............... H04L 63/0442
380/281
2014/0050318 A1* 2/2014 Hayashi ................ H04L 9/3073
380/46

FOREIGN PATENT DOCUMENTS

JP    2000-244474 A    9/2000
JP    2012-150378 A    8/2012

OTHER PUBLICATIONS

Cheng-Kang Chu et al., "Conditional Proxy Broadcast Re-Encryption", Lecture Notes in Computer Science, 2009, pp. 327-342, vol. 5594.
Jin Sun et al., "CCA-Secure Unidirectional Proxy Broadcast Re-encryption in the Standard Model", Journal of Computational Information Systems, Jul. 15, 2012, pp. 5909-5916, vol. 8, No. 14.

(Continued)

*Primary Examiner* — Brandon Hoffman
*Assistant Examiner* — Michael D Anderson
(74) *Attorney, Agent, or Firm* — Sughrue Mion, PLLC (57) ABSTRACT

Provided is a re-encryption system. The re-encryption system includes a replacement key generation unit. The replacement key generation unit receives a master key owned by a manager, an allowable decryptor set before change, and an allowable decryptor set after change. The re-encryption system generates and outputs a replacement key to convert a ciphertext which can be decrypted with a secret key of a decryptor belonging to the allowable decryptor set before change to a ciphertext which can be decrypted with a secret key of a decryptor belonging to the allowable decryptor set after change.

7 Claims, 6 Drawing Sheets

(56) References Cited

OTHER PUBLICATIONS

Dan Boner et al., "Collusion Resistant Broadcast Encryption With Short Ciphertexts and Private Keys", Advances in Cryptology-CRYPTO 2005: 25th Annual International Cryptology Conference, Lecture Notes in Computer Science 3621, Aug. 14-18, 2005, pp. 258-275, Springer, Santa Barbara, California.

International Search Report for PCT/JP2013/004576 dated Aug. 20, 2013.

* cited by examiner

RE-ENCRYPTION SYSTEM, RE-ENCRYPTION METHOD AND RE-ENCRYPTION PROGRAM

CROSS REFERENCE TO RELATED APPLICATIONS

This application is a National Stage of International Application No. PCT/JP2013/004576 filed Jul. 29, 2013, claiming priority based on Japanese Patent Application No. 2012-189548 filed Aug. 30, 2012, the contents of all of which are incorporated herein by reference in their entirety.

TECHNICAL FIELD

The present invention relates to a re-encryption system, a re-encryption method, and a re-encryption program with respect to broadcast encryption which converts to a broadcast ciphertext in which a plurality of receivers can decrypt, and more specifically to a technique in which the conversion changes a set of receivers which can decrypt a target ciphertext.

BACKGROUND ART

Figure 6:
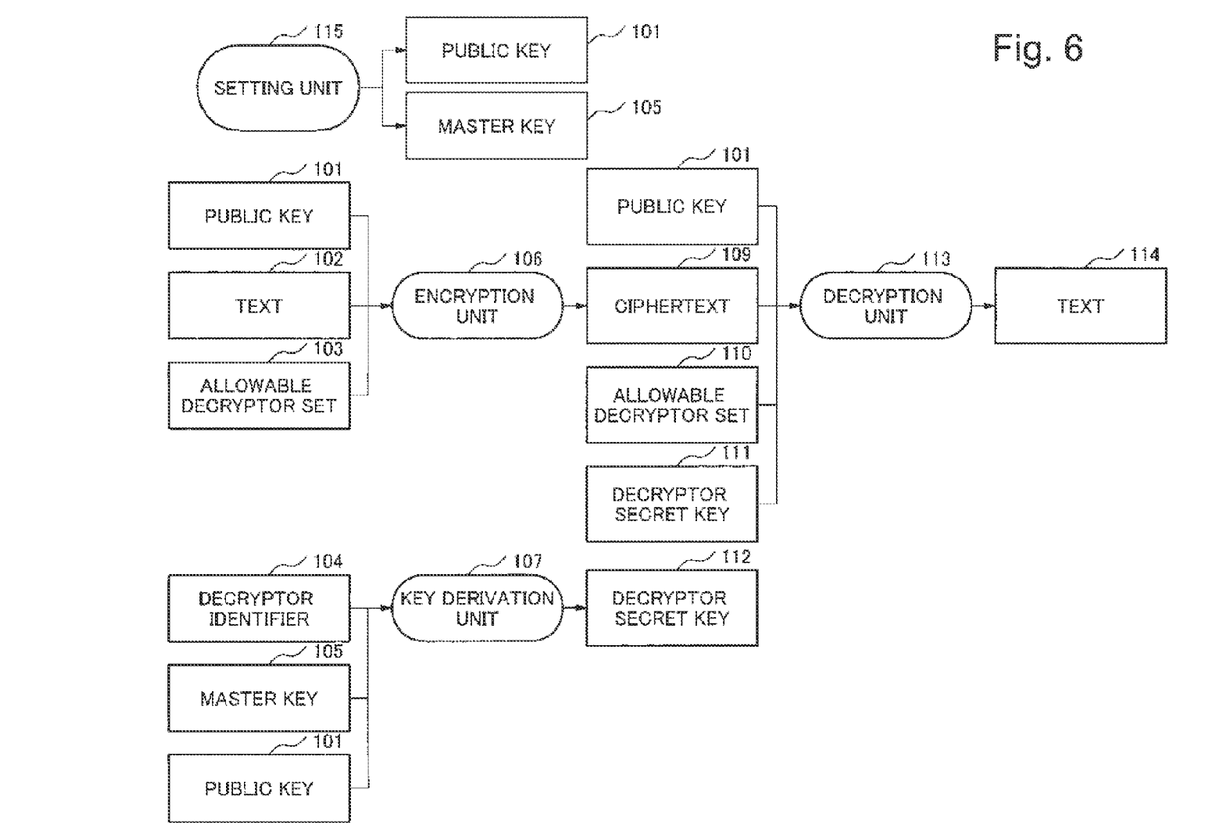
FIG. 6 is a block diagram illustrating a broadcast encryption system which uses a general broadcast encryption method.

A broadcast encryption method is an encryption method in which a plurality of receivers, which have individually a different secret key, receive an identical ciphertext, and decryption by each receiver results in the same plaintext. General broadcast encryption methods include, for example, an encryption method disclosed in NPL (Non Patent Literature) 1. FIG. 6 is a block diagram illustrating a broadcast encryption system which uses a general broadcast encryption method. The broadcast encryption system illustrated in FIG. 6 includes a setting unit 115, a key derivation unit 107, an encryption unit 106, and decryption unit 113.

The setting unit 115 generates a public key 101 and a master key 105. The encryption unit 106 generates a ciphertext 109 by using the public key 101, an allowable decryptor set 103 which is data specifying a set of allowable decryptors, and a text 102. The key derivation unit 107 generates a decryptor secret key 112 by using a master key 105, a public key 101, and a decryptor identifier 104. The decryption unit 113 generates a text 114 which is a result of decrypting the ciphertext 109 by using the public key 101, the ciphertext 109, an allowable decryptor set 110 which is data specifying a set of allowable decryptors, and a decryptor secret key 111.

In the broadcast encryption system illustrated in FIG. 6, if data specifying the allowable decryptor set 103 received by the encryption unit 106 and data specifying the allowable decryptor set 110 received by the decryption unit 113 are identical, the ciphertext 109 output by the encryption unit 106 and the ciphertext 109 received by the decryption unit 113 are identical, and the decryptor secret key 111 received by the decryption unit 113 is a secret key of a decryptor belonging to a set of allowable decryptors, which is specified by the allowable decryptor set 110 received by the decryption unit 113, the text 102 received by the encryption unit 106 and the text 114 output by the decryption unit 113 become identical.

In a data storage service which uses a cloud or the like, such the broadcast encryption method contributes to raising the safety of the service. For example, in a case that an organization such as a corporate enterprise saves data on a cloud or the like, the data which only the members of the organization should be able to read is encrypted by using the broadcast encryption method and saved on the cloud or the like. The members of the organization belong to the allowable decryptor set 103 and are provided with the secret key individually. The members of the organization access the cloud or the like when the members need the data, and retrieve the needed data. Although the data is encrypted, any member of the organization can decrypt the data by following the decryption method in the broadcast encryption method and use the decrypted data.

Although an authentication system on a cloud or the like can carry out proper access control for a request to retrieve data by limiting persons allowed to access the data to members of a predetermined organization through authentication, there is a risk that an error may take place in the access control. There is another risk that the management of the cloud or the like is inadequate, or a person without an access right obtains data due to misconduct by a manager of the cloud or the like. It is difficult for an outside user to confirm that the management of the cloud or the like is adequate and the manager of the cloud or the like does not conduct wrongdoing. However, because even if a person other than the members of the organization successfully obtains data, the person cannot decrypt the data, using the broadcast encryption method makes it possible to prevent the contents of the data from being disclosed to the outside of the organization.

Moreover, another benefit in using the broadcast encryption method lies in the fact that the allowable decryptor set can be changed in a case that a member change takes place. When a new member joins the organization, the key derivation unit 107 generates and provides the new member with the decryptor secret key 112 and adds the new member to the allowable decryptor set. Then, in subsequent data saving, data is encrypted by using the new allowable decryptor set. In an opposite case that the member leaves the organization, the leaving member is removed from the allowable decryptor set. Then, in subsequent data saving, data is encrypted by using the new allowable decryptor set. With these operations, it becomes possible that only the latest members belonging to the updated allowable decryptor set can decrypt newly saved data.

CITATION LIST

Non Patent Literature

[NPL1] Dan Boneh, Craig Gentry, Brent Waters, "Collusion Resistant Broadcast Encryption With Short Ciphertexts and Private Keys", Advances in Cryptology-CRYPTO 2005: 25$^{th}$ Annual International Cryptology Conference, Santa Barbara, Calif., USA, Aug. 14-18, 2005, Proceedings. Lecture Notes in Computer Science 3621 Springer 2005, ISBN3-540-28114-2, pp. 258-275.

SUMMARY OF INVENTION

Technical Problem

In a data storage service based on the broadcast encryption method as described in NPL 1, when an event such as an addition or removal of a member takes place, changing an allowable decryptor set makes it possible to update access restriction to data to be newly saved. On the other hand, access restriction to decryption of data which have been already saved cannot be updated. That is because who can decrypt data which have been already saved is determined when the data is encrypted and will not be changed afterwards.

Countermeasure against such a problem includes a method in which all saved data are retrieved once in a case that a member constituting an organization is changed, decrypted by using the old allowable decryptor set, encrypted by using the new allowable decryptor set, and saved again. However, because in many general organizations, in particular a large organization, change of constituent members of the organization is conducted frequently, carrying out processing including retrieval, decryption, and encryption of data as described above at every member change causes a significant increase in the system load. In other words, in using the service such as the data storage service which uses the cloud or the like, it is not practical for many organizations to rely on the general broadcast encryption method as described in NPL 1 for access control in the service.

Accordingly, it is an object of the present invention to provide a re-encryption system, a re-encryption method, and a re-encryption program which are able to facilitate access control to data.

Solution to Problem

A re-encryption system of the present invention includes a replacement key generation unit that receives a master key owned by a manager, an allowable decryptor set before change, and an allowable decryptor set after change, and generates and outputs a replacement key to convert a ciphertext which can be decrypted with a secret key of a decryptor belonging to the allowable decryptor set before change to a ciphertext which can be decrypted with a secret key of a decryptor belonging to the allowable decryptor set after change.

A re-encryption method of the present invention includes:

receiving a master key owned by a manager, an allowable decryptor set before change, and an allowable decryptor set after change; and generating and outputting a replacement key to convert a ciphertext which can be decrypted with a secret key of a decryptor belonging to the allowable decryptor set before change to a new ciphertext which can be decrypted with a secret key of a decryptor belonging to the allowable decryptor set after change.

A re-encryption program of the present invention which causes a computer to execute processing to receive a master key owned by a manager, an allowable decryptor set before change, and an allowable decryptor set after change; and processing to generate and output a replacement key to convert a ciphertext which can be decrypted with a secret key of a decryptor belonging to the allowable decryptor set before change to a new ciphertext which can be decrypted with a secret key of a decryptor belonging to the allowable decryptor set after change.

Advantageous Effects of Invention

According to the present invention, it is possible to facilitate access control to data.

DESCRIPTION OF EMBODIMENTS

In the following description, groups 1 and 2 are assumed to be cyclic groups of order q. It is assumed that a bilinear map e: group 1×group 1→group 2 exists and Fq is a prime field of characteristic q. The group 1 is described as an additive cyclic group. An element of Fq and an element of the group 1 are defined as utilizing a multiplication. In a case that the element of Fq is $\alpha$ and the element of the group 1 is G, the multiplication thereof is denoted by $\alpha G$. An element of the group 2 is described as a multiplicative cyclic group. An element of Fq and an element of the group 2 are defined as utilizing an exponentiation. In a case that the element of Fq is $\alpha$ and the element of the group 2 is g, the exponentiation thereof is denoted by $g^\alpha$. As a realization method of the groups 1 and 2, a method using an elliptic curve or the like is known.

First Exemplary Embodiment

Figure 1:
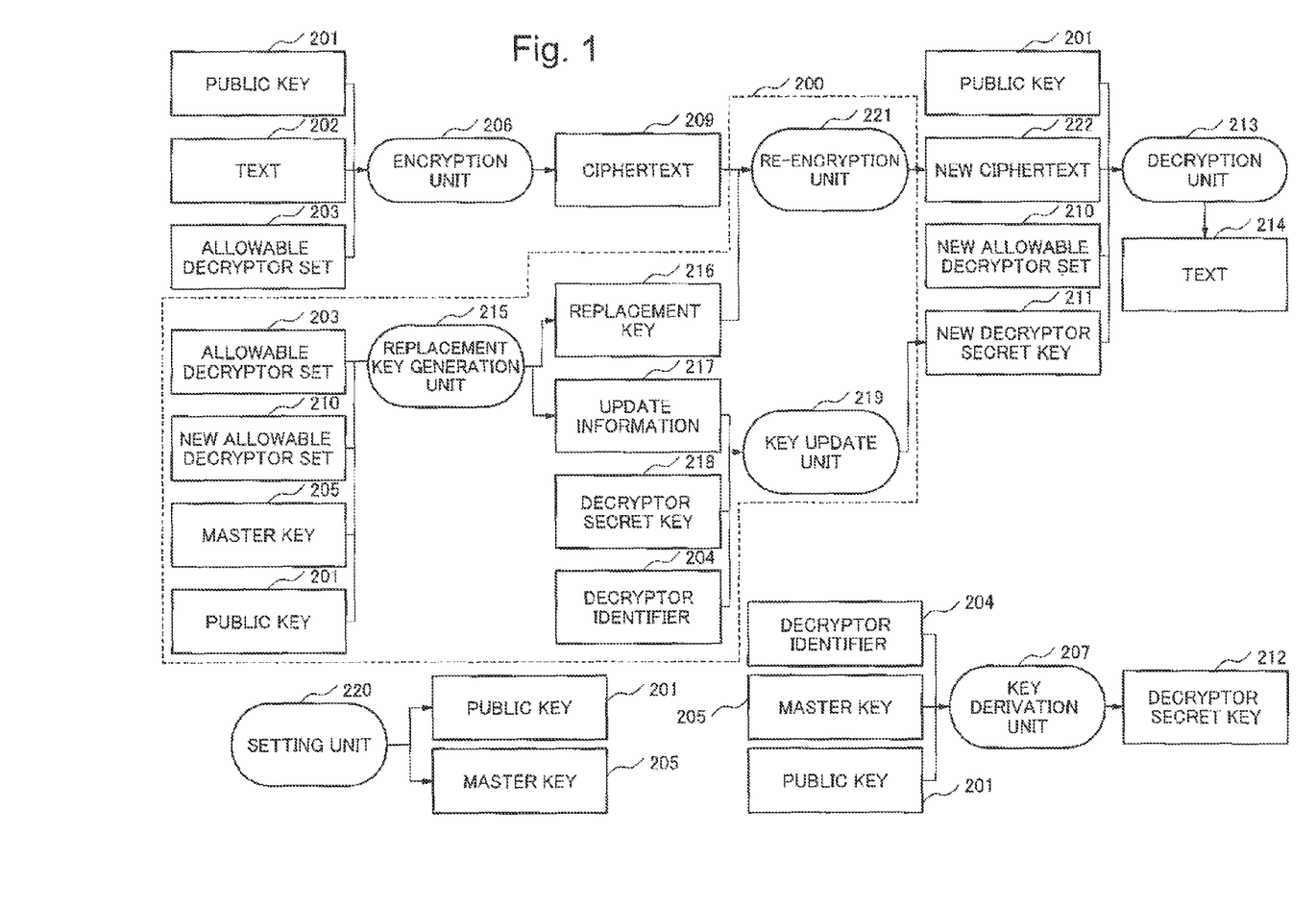
FIG. 1 is a block diagram illustrating a configuration of a first exemplary embodiment and a second exemplary embodiment of a re-encryption system according to the present invention.

FIG. 1 is a block diagram illustrating a configuration of a first exemplary embodiment of a re-encryption system according to the present invention. The re-encryption system of the first exemplary embodiment includes a setting unit 220, a key derivation unit 207, an encryption unit 206, a re-encryption device 200, and a decryption unit 213. The re-encryption device 200 includes a replacement key generation unit 215, a re-encryption unit 221, and a key update unit 219. The re-encryption system of the first exemplary embodiment is implemented with hardware designed to carry out specific arithmetic processing or an information processing apparatus such as a CPU (Central Processing Unit) which operates based on a program.

The setting unit 220 receives an integer L which represents the number of potential decryptors. The setting unit 220 chooses groups 1 and 2 as cyclic group of order q from among groups on which a bilinear map e: group 1×group 1→group 2 exists. Fq denotes a prime field of characteristic q. The setting unit 220 selects a generator element G of the group 1, and selects $\alpha$ and $\gamma$ from Fq in a random manner. The setting unit 220 generates $g_T = e(G, G)$, $(G[i])_{i=1, \ldots, L, L+2, \ldots, 2L} = (\alpha^i G)_{i=1, \ldots, L, L+2, \ldots, 2L}$, and $F = \gamma G$. The setting unit 220 outputs $pk = (q, G, G_T, e(\ ), G, (G[i])_{i=1, \ldots, L, L+2, \ldots, 2L}, F)$ as a public key 201 and $mk := (\alpha, \gamma)$ as a master key 205. The master key is a key a person who has an access right to data is allowed to own.

The key derivation unit 207 receives the public key 201 ($pk$), the master key 205 ($mk$), and a decryptor identifier

204 ($k$). The key derivation unit 207 outputs sk[k]=D[k]=γG[k] as a secret key 212 of a decryptor which has the decryptor identifier of k.

The encryption unit 206 receives the public key 201 ($pk$), an allowable decryptor set 203 (S), and a text 202 and chooses τ from Fq in a random manner. The encryption unit 206 generates h=e(G[1], G[L])$^τ$, C[0]=τG, and C[1]=τ(F+$Σ_{i∈S}$G[L+1−i]). The encryption unit 206 sets a result of encryption of the text by using a header hdr=h as a shared key to C[2] and outputs ct=(C[0], C[1], C[2]) as a ciphertext 209.

The replacement key generation unit 215 receives the public key 201 ($pk$), the master key 205 (mk:=(α, γ)), the current allowable decryptor set 203 (S), and a new allowable decryptor set 210 (S'). The replacement key generation unit 215 chooses δ from Fq in a random manner and generates F'=δG, ρ=(γ+δ+$Σ_{i∈S}$α$^{L+1−i}$)/(γ+$Σ_{i∈S}$α$^{L+1−i}$), (G'[i])$_{i∈U}$=(δG[i])$_{i∈U}$. Where, U is {1, . . . , L}. The replacement key generation unit 215 outputs mk'=(α, γ+δ) as a new master key, rk=ρ as a replacement key 216, and (pk'=F', (uk[i])$_{i∈U}$=(G'[i])$_{i∈U}$) as an update information 217.

The re-encryption unit 221 receives the ciphertext 209 (ct:=(C[0], C[1], C[2])) and the replacement key 216 (rk=ρ). The re-encryption unit 221 outputs a new ciphertext 222 (ct'=(C[0], ρC[1], C[2])).

The key update unit 219 receives the decryptor identifier 204 ($k$), the public key 201 ($pk$), at least a part of the update information 217 (pk'=F', uk[k]=G'[i]), and a decryptor secret key 218 with an identifier of k (sk[k]=D[k]). The key update unit 219 updates the decryptor secret key 218 with a decryptor identifier of k (sk[k]) to a new decryptor secret key 211 (D[k]+G'[k]) and a element F of the public key 201 ($pk$) to F+F'.

The decryption unit 213 receives the decryptor identifier 204 ($k$), the public key 201 ($pk$), the ciphertext 209 or the new ciphertext 222 (ct=(C[0], C[1], C[2])), the allowable decryptor set 203 (S) or the new allowable decryptor set 210 (S'), and the decryptor secret key 218 or the new decryptor secret key 211 (sk[k]=D[k]). The decryption unit 213 calculates hdr=e(G[k], C[1])/e(C[0], D[k]+$Σ_{i∈S\{k\}}$G[L+1−i+k]), decrypts C[2] with hdr to obtain a text 214, and outputs the obtained text.

The re-encryption system of the first exemplary embodiment works properly as described as below. First, thing, which the header generated in encryption is the same as the header output in decryption in case that re-encryption is not carried out, is described below.

$$hdr = e(G[k], C[1])/e\left(C[0], D[k] + \sum_{i∈S\setminus\{k\}} G[L+1-i+k]\right)$$
$$= e\left(G[k], τu\left(F + \sum_{i∈S} G[L+1-i]\right)\right)/$$
$$e\left(τG, γG[k] + \sum_{i∈S\setminus\{k\}} G[L+1-i+k]\right)$$
$$= e\left(τG, G[L+1] + α^kγG + \sum_{i∈S\setminus\{k\}} G[L+1-i+k]\right)/$$
$$e\left(τG, α^kγG[k] + \sum_{i∈S\setminus\{k\}} G[L+1-i+k]\right)$$
$$= e(G[1], G[L+1])^τ = h$$

Thing, which the header generated in encryption is also the same as the header output in decryption in case that re-encryption is carried out, is described as below. By using k∈S' with respect to the updated S', the updated sk'[k], and the updated public key, the re-encrypted ciphertext ct' is decrypted as described below. Where, γ' is γ'=γ+δ.

$$hdr = e(G[k], ρC[1])/e(C[0], D[k] + G'[k] +$$
$$Π_{i∈S'\setminus\{k\}}G[L+1-i+k])$$
$$= e\left(G[k], ρτ\left(F + \sum_{i∈S} G[L+1-i]\right)\right)/$$
$$e\left(τG, γG[k] + G'[k] + \sum_{i∈S'\setminus\{k\}} G[L+1-i+k]\right)$$
$$= e\left(G[k], ρτ\left(γ + \sum_{i∈S} α^{L+1-i}\right)G\right)/$$
$$e\left(τG, γ'G[k] + \sum_{i∈S'\setminus\{k\}} G[L+1-i+k]\right)$$
$$= e\left(G[k], τ\left(γ'G + \sum_{i∈S'} α^{L+1-i}\right)\right)/$$
$$e\left(τG, γ'G[k] + \sum_{i∈S'\setminus\{k\}} G[L+1-i+k]\right)$$
$$= e\left(τα^kG, γ'G[k] + \sum_{i∈S'} G[L+1-i]\right)/$$
$$e\left(τG, γ'G[k] + \sum_{i∈S'\setminus\{k\}} G[L+1-i+k]\right)$$
$$= e\left(τG, G[L+1] + α^kγ'G + \sum_{i∈S'\setminus\{k\}} G[L+1-i+k]\right)/$$
$$e\left(τG, α^kγ'G + \sum_{i∈S'\setminus\{k\}} G[L+1-i+k]\right)$$
$$= e(G[1], G[L])^τ = h$$

Figure 2:
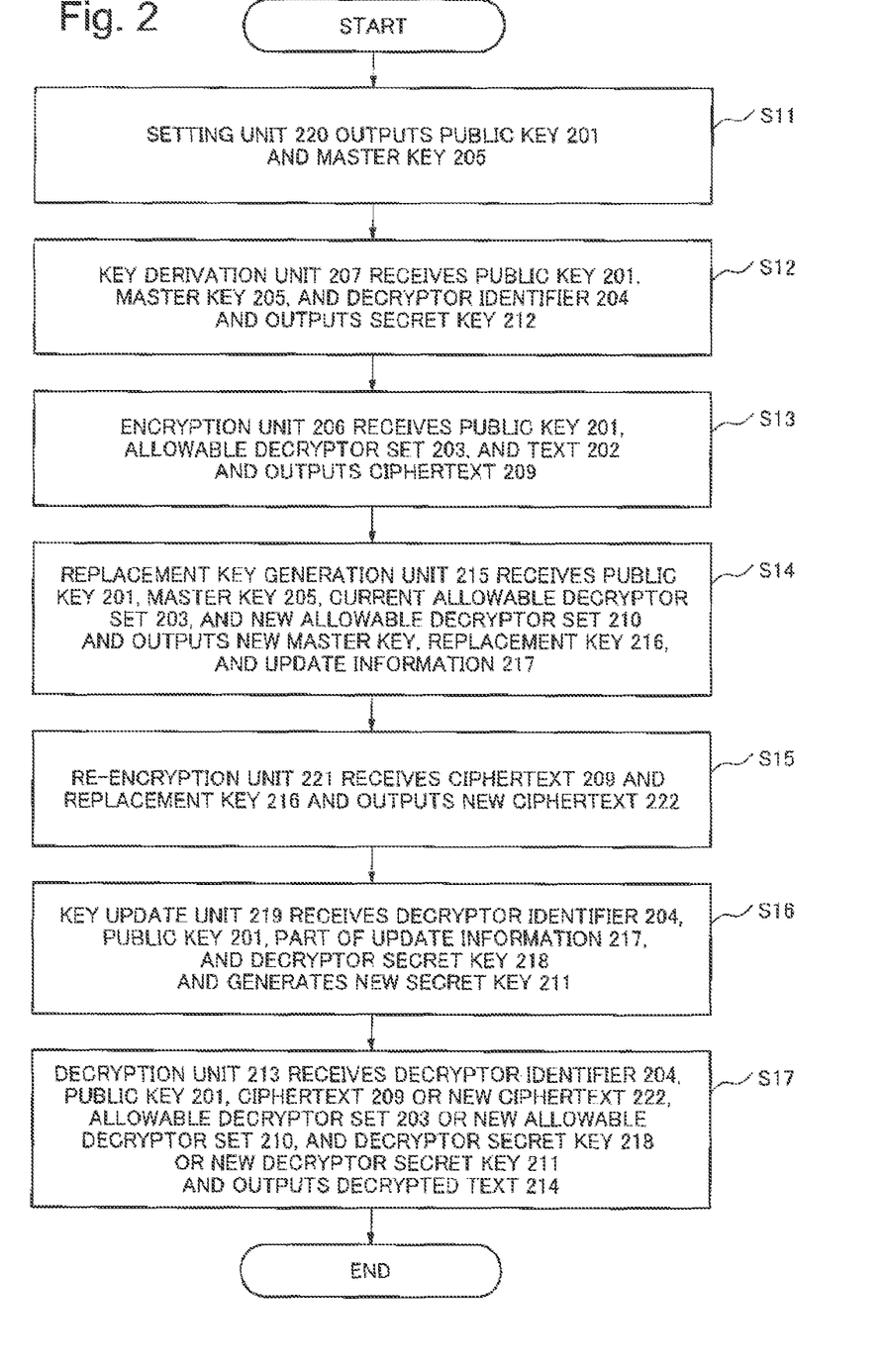
FIG. 2 is a flowchart illustrating an example of operations of the first exemplary embodiment and the second exemplary embodiment of the re-encryption system according to the present invention.

Next, an operation of the re-encryption system of the first exemplary embodiment will be described. FIG. 2 is a flowchart illustrating an example of the operation of the first exemplary embodiment of the re-encryption system according to the present invention. In addition, order of operations of the re-encryption system of the first exemplary embodiment is not limited to the following order.

The setting unit 220 receives the integer L, which represents the number of potential decryptors. The setting unit 220 then outputs the public key 201 ($pk$) and the master key 205 ($mk$) (step S11). The key derivation unit 207 receives the public key 201 ($pk$), the master key 205 ($mk$), and the decryptor identifier 204 ($k$) and outputs sk[k]=D[k]=γG[k] as the secret key 212 of the decryptor with the decryptor identifier of k (step S12).

The encryption unit 206 receives the public key 201 ($pk$), the allowable decryptor set 203 (S), and the text 202, sets the result of encryption of the text by use of the header hdr=h as the shared key to C[2], and outputs the ciphertext 209 (ct=(C[0], C[1], C[2])) (step S13).

The replacement key generation unit 215 receives the public key 201 ($pk$), the master key 205 (mk:=(α, γ)), the current allowable decryptor set 203 (S), and the new allowable decryptor set 210 (S'). The replacement key generation unit 215 outputs mk'=(α, γ+δ) as the new master key, rk=ρ as the replacement key 216, and (pk'=F', (uk[i])$_{i∈U}$=(G'[i])$_{i∈U}$) as the update information 217 (step S14).

The re-encryption unit 221 receives the ciphertext 209 (ct:=(C[0], C[1], C[2])) and the replacement key 216 (rk=ρ) and outputs ct'=(C[0], ρC[1], C[2]) as the new ciphertext 222 (step S15).

The key update unit 219 receives the decryptor identifier 204 ($k$), the public key 201 ($pk$), a part of the update information 217 (pk'=F', uk[k]=G'[i]), the decryptor secret key 218 with the identifier of k (sk[k]=D[k]), and updates the decryptor secret key 218 with the decryptor identifier of k (sk[k]) to the new decryptor secret key 211 (D[k]+G'[k]) (step S16).

The decryption unit 213 receives the decryptor identifier 204 ($k$), the public key 201 ($pk$), the ciphertext 209 or the new ciphertext 222 (ct=(C[0], C[1], C[2])), the allowable decryptor set 203 (S) or the new allowable decryptor set 210 (S'), and the decryptor secret key 218 or the new decryptor secret key 211 (sk[k]=D[k]), calculates hdr, decrypts C[2] with hdr to obtain the text 214, and outputs the obtained text 214 (step S17).

As described above, the re-encryption system of the first exemplary embodiment changes (re-encrypts) the ciphertext, which can decrypted by the decryptor belonging to the allowable decryptor set S before change, to the ciphertext which can decrypted by the decryptor belonging to the allowable decryptor set S' after change. Accordingly, the re-encryption system of the first exemplary embodiment makes it possible to apply access control to data dynamically and easily.

Second Exemplary Embodiment

A re-encryption system of a second exemplary embodiment will be described below. Regarding description of a configuration and operation of the re-encryption system of the second exemplary embodiment, the description of the same part as those of the re-encryption system of the first exemplary embodiment illustrated in FIGS. 1 and 2 are omitted.

The setting unit 220 receives the integer L, which represents the number of potential decryptors. Groups 1 and 2, which are cyclic groups of order q, are chosen from among groups on which a bilinear map e: group 1×group 1→group 2 exists. Fq is defined to be the prime field of characteristic q. The setting unit 220 chooses the generator G of the group 1, and also chooses $\alpha$, $(\beta[b])_{b=1, 2}$ and $(\gamma[b])_{b=1, 2}$ from Fq in a random manner. Where, b takes a value of, for example, 1 or 2. The setting unit 220 generates $g_T$=e(G, G), and also generates $(G[b])_{b=1, 2}=(\{\beta[b]\}G)_{b=1, 2}$, $(F[b])_{b=1, 2}=(\{\gamma[b]\}G)_{b=1, 2}$, and $(G[b, i])_{b=1, 2; i=1, \ldots, L, L+2, \ldots, 2L}=(\alpha^i G[b])_{i=1, \ldots, L, L+2, \ldots, 2L}$. The setting unit 220 then outputs pk=(q, G, GT, e( ), G, $(G[b, i])_{b=1, 2; i=1, \ldots, L, L+2, \ldots, 2L}$, $(G[b], F[b])_{b=1, 2}$) as the public key 201 and mk:=($\alpha$, $(\beta[b], \gamma[b])_{b=1, 2}$) as the master key 205.

The key derivation unit 207 receives the public key 201 ($pk$), the master key 205 ($mk$), and the decryptor identifier 204 ($k$). $\eta[1, k]$ is chosen from Fq in a random manner. It is defined such that $\eta[2, k]=((\Sigma_{i=1, 2}\beta[b]\gamma[b])-\beta[1]\eta[1, k])/\beta[2]$. The key derivation unit 207 outputs the secret key 212 of the decryptor with the identifier of k (sk[k]=(D[b, k])$_{b=1, 2}$=($\alpha^k \eta[b,k]G)_{b=1, 2}$).

The encryption unit 206 receives the public key 201 ($pk$), the allowable decryptor set 203 (S), and the text 202. $\tau$ is chosen from Fq in a random manner. The encryption unit 206 generates h:=$\Pi_{b=1, 2}$e(G[b, 1], G[b, L])$^\tau$, (C[0, b])$_{b=1, 2}$:=($\tau$G[b])$_{b=1, 2}$, and (C[1, b])$_{b=1, 2}$:=($\tau$(F[b]+$\Sigma_{i \in S}$G[b, L+1-i]))$_{b=1, 2}$. The encryption unit 206 sets the result of encryption of the text by using the header hdr=h as the shared key to C[2] and outputs ct=((C[0, b], C[1, b])$_{b=1, 2}$, C[2]) as the ciphertext 209.

The replacement key generation unit 215 receives the public key 201 ($pk$), the master key 205 (mk:=($\alpha$, ($\beta[b]$, $\gamma[b])_{b=1, 2}$)), the current allowable decryptor set 203 (S), the new allowable decryptor set 210(S'). The replacement key generation unit 215 chooses $(\delta[b])_{b=1, 2}$ from Fq in a random manner, generates (F'[b])$_{b=1, 2}$=($\delta[b]G)_{b=1, 2}$, and also generates $(\rho[b])_{b=1, 2}=((\gamma[b]+\delta[b]+\beta[b](\Sigma_{i \in S}\alpha^{L+1-i}))/(\gamma[b]+\beta[b](\Sigma_{i \in S}\alpha^{L+1-i})))_{b=1, 2}$. The replacement key generation unit 215 chooses $(\eta'[1, i])_{i=1, \ldots, L}$ from Fq in a random manner and generates $(\eta'[2, i])_{i=1, \ldots, L}=((\Sigma_{b=1, 2}\beta[b]\delta[b])-\beta[1]\eta'[1, i])/\beta[2])_{i=1, \ldots, L}$.

The replacement key generation unit 215 generates $(G'[b, i])_{b=1, 2; i=1, \ldots, L}=\eta'[b, i]\alpha^i G)_{b=1, 2; i=1, \ldots, L}$. The replacement key generation unit 215 outputs the new master key (mk'=($\alpha$, ($\beta[b]$, $\gamma[b]+\delta[b])_{b=1, 2}$)), the replacement key 216 (rk=($\rho[b])_{b=1, 2}$), and the update information 217 (F':=(F'[b])$_{b=1, 2}$, (uk[i])$_{i=1, \ldots, L}$:=((G'[b, i])$_{b=1, 2})_{i=1, \ldots, L}$).

The re-encryption unit 221 receives the ciphertext 209 (ct:=((C[0, b], C[1, b])$_{b=1, 2}$, C[2])) and the replacement key 216 (rk:=($\rho[b])_{b=1, 2}$). The re-encryption unit 221 outputs the new ciphertext 222 (ct'=(C[0, b], $\rho$[b]C[1, b])$_{b=1, 2}$).

The key update unit 219 receives the decryptor identifier 204 ($k$), the public key 201 ($pk$), a part of the update information 217 (pk'=F=(F'[b])$_{b=1, 2}$, uk[k]=(G'[b, k])$_{b=1, 2}$), and (sk[k]=(D[b, k])$_{b=1, 2}$) as the decryptor secret key 218 with the identifier of k. The key update unit 219 updates the decryptor secret key 218 (sk[k]) of the decryptor with the identifier of k to the new decryptor secret key 211 (D[b, k]+G'[b, k])$_{b=1, 2}$. The key update unit 219 updates element (F[b])$_{b=1, 2}$ of pk to (F[b]+F'[b])$_{b=1, 2}$.

The decryption unit 213 receives the decryptor identifier 204 ($k$), the public key 201 ($pk$), the ciphertext 209 or the new ciphertext 222 (ct=((C[0, b], C[1, b])$_{b=1, 2}$, C[2])), and the decryptor secret key 218 or the new decryptor secret key 211 (sk[k]=(D[b, k])$_{b=1, 2}$). The decryption unit 213 calculates h=($\Pi_{b=1, 2}$e(G[b, k], C[1, b])/($\Pi_{b=1, 2}$e(C[0, b], D[b, k]+$\Sigma_{i \in S \setminus \{k\}}$G[b, L+1-i+k])), decrypts C[2] with hdr to obtain the text 214, and outputs the decrypted text.

That the re-encryption system of the second exemplary embodiment works properly is known by the following description. First, thing that the header generated in encryption is the same as the header output by the decryption unit 213 in case that re-encryption is not carried out is described as below. In the description, A^B denotes $A^B$.

$$h = (\Pi_{b=1,2} e(G[b, k], C[1, b]))/$$

$$\left(\Pi_{b=1,2} e\left(C[0, b], D[b, k] + \sum_{i \in S \setminus \{k\}} G[b, L+1-i+k]\right)\right)$$

$$= (\Pi_{b=1,2} e(G[b, k], \tau(F[b] + \sum_{i \in S} G[b, L+1-i])))/$$

$$\left(\Pi_{b=1,2} e\left(\tau G[b], \alpha^k \eta[b]G + \sum_{i \in S \setminus \{k\}} G[b, L+1-i+k]\right)\right)$$

$$= (\Pi_{b=1,2} e(\tau G[b], G[b, L+1] + \alpha^k \gamma[b]G +$$

$$\sum_{i \in S \setminus \{k\}} G[b, L+1-i+k]))/$$

$$\left(\Pi_{b=1,2} e\left(\tau G[b], \alpha^k \eta[b]G + \sum_{i \in S \setminus \{k\}} G[b, L+1-i+k]\right)\right)$$

$$= (\Pi_{b=1,2} e(\tau G[b], G[b, L+1]) \Pi_{b=1,2}$$

$$e\left(\tau G[b], \sum_{i \in S \setminus \{k\}} G[b, L+1-i+k]\right))/$$

$$\left(\Pi_{b=1,2} e\left(\tau G[b], \sum_{i \in S \setminus \{k\}} G[b, L+1-i+k]\right)\right) \cdot$$

$$\left(e(G, G)^{\wedge}\left(\tau \alpha^k \sum_{b=1,2} \beta[b]\gamma[b]\right)\right)/$$

$$\left(e(G, G)^{\wedge}\left(\tau \alpha^k \sum_{b=1,2} \beta[b]\eta[b]\right)\right)$$

$$= \Pi_{b=1,2} e(G[b], G[b, L+1])\tau$$

$$= \Pi_{b=1,2} e(G[b], G[b])^{\wedge}(\tau \alpha^{L+1}) = h$$

That the header generated in encryption is also the same as the header output by the decryption unit 213 in case that re-encryption is carried out is known like below. By using k∈S' with respect to the updated S', the updated sk'[k], and the updated public key, the re-encrypted ciphertext ct' is decrypted in the following manner.

$$h = (\Pi_{b=1,2} e(G[b, k], \rho[b]C(1, b)))/$$
$$\left(\Pi_{b=1,2} e\left(C[0, b], D[b, k] + G'[b, k]\sum_{i \in S\setminus\{k\}} G[b, L+1-i+k]\right)\right)$$
$$= \left(\Pi_{b=1,2} e\left(G[b, k], \tau\left[F[b] + F'[b] + \sum_{i \in S} G[b, L+1-i]\right]\right)\right)/$$
$$(\Pi_{b=1,2} e(\tau G[b], \alpha k(\eta[b, k] + \eta'[b, k])G +$$
$$\sum_{i \in \{k\}} G[b, L+1-i+k]\right))$$
$$= \Pi_{b=1,2} e(G[b], G[b])^{\wedge}(\tau \alpha^{L+1}) = h$$

As described above, the re-encryption system of the second exemplary embodiment changes the ciphertext, which can decrypted by the decryptor belonging to the allowable decryptor set S before change, to the ciphertext which can decrypted by the decryptor belonging to the allowable decryptor set S' after change. Accordingly, changing the allowable decryptor set for the ciphertext makes it possible to apply access control to data dynamically and easily.

Third Exemplary Embodiment

Figure 3:
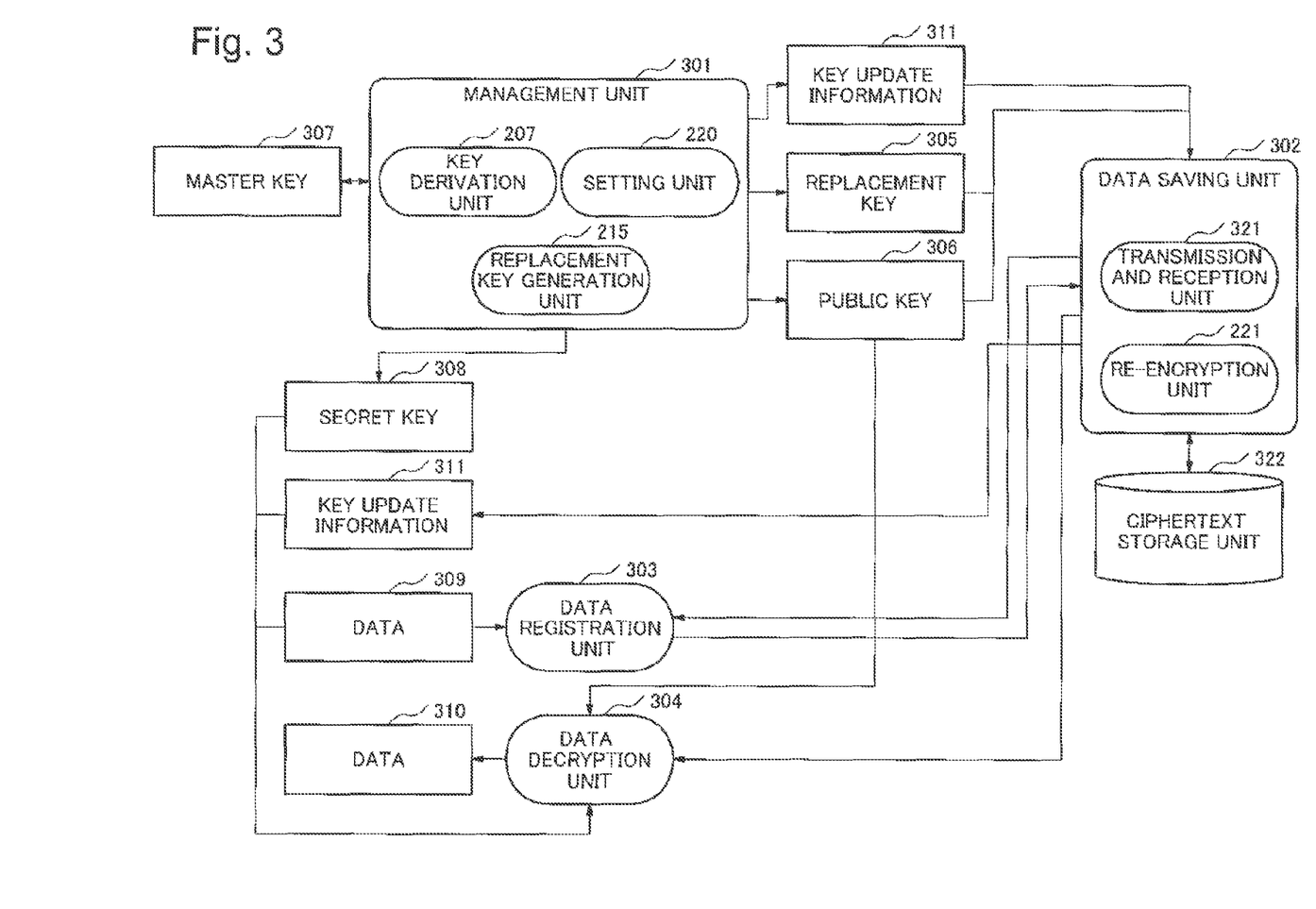
FIG. 3 is a block diagram illustrating a configuration of a third exemplary embodiment of the re-encryption system according to the present invention.

FIG. 3 is a block diagram illustrating a configuration of a third exemplary embodiment of the re-encryption system according to the present invention. The setting unit 220, the key derivation unit 207, the encryption unit 206, the replacement key generation unit 215, the re-encryption unit 221, the key update unit 219, and the decryption unit 213, which are described below, are the same as those described in the first exemplary embodiment.

The re-encryption system of the third exemplary embodiment includes a management unit 301, a data saving unit 302 and a ciphertext storage unit 322. The management unit 301 includes the setting unit 220, the key derivation unit 207 and the replacement key generation unit 215 and is operated by a manager. The data saving unit 302 includes a data transmission and reception unit 321, and the re-encryption unit 221, saves the ciphertext and is operated by a data saver. A data decryption unit 304 and a data registration unit 303 are operated by a user of the re-encryption system. The data registration unit 303 includes the encryption unit 206, and the data decryption unit 304 includes the key update unit 219 and the decryption unit 213. The decryptor may be a data registrar. The data registration unit 303 and the data decryption unit 304 may is a single entity.

The management unit 301 generates a public key 306 and a master key 307 by using the setting unit 220. The master key 307 is saved by the management unit 301 and is not disclosed to any person except the manager. The manager determines decryptors which are allowed to read data and defines the set of decryptors as the allowable decryptor set. The management unit 301 generates a secret key 308 for each decryptor by using the key derivation unit 207 and provides the data decryption unit 304 with the secret key.

In case that the data registrar entrusts the data saver with the save of data 309, the data registration unit 303 accesses the data saving unit 302 to obtain a latest public key 306. Next, the encryption unit 206 in the data registration unit 303 encrypts the data 309 and provide the data saving unit 302 with the encrypted data. In this operation, the encryption unit 206 carries out the encryption by specifying the allowable decryptor set. This specification is the access control.

In case that the manager change the allowable decryptor set, such as increases or decreases the number of allowable decryptors which are able to decrypt the encrypted data, the replacement key generation unit 215 in the management unit 301, by using the public key 201, the old allowable decryptor set S, the new allowable decryptor set S', and the master key 307, generates a replacement key 305 (rk(S, S')) and transmits the replacement key to the data saving unit 302. In this operation, the management unit 301 also transmits generated key update information 311 to the data saving unit 302.

In case that the re-encryption unit 221 in the data saving unit 302 receives the replacement key 305 (rk(S, S')), the re-encryption unit 221 re-encrypts each encrypted ciphertext by using the saved old allowable decryptor set S and replaces the old ciphertext with the obtained new ciphertext. With this replacement, a set of decryptors which are able to decrypt the saved ciphertext is updated to the new allowable decryptor set S'. The public key 306 is also changed to the latest one by using the update information.

In case that the decryptor intends to fetch data saved in the data saving unit 302, the decryptor accesses the data saving unit 302 through the data decryption unit 304. In this operation, in case that the data decryption unit 304 receives the new key update information 311 from the data saving unit 302, the decryptor, by using the key update unit 219 in the data decryption unit 304, updates the secret key 308. Next, the decryptor fetches the intended ciphertext data, and, if the decryptor itself belongs to the allowable decryptor set relating to the fetched ciphertext, the decryptor decrypts the ciphertext through the decryption unit 213 by using the updated secret key 308 of the decryptor itself to obtain data 310.

Figure 4:
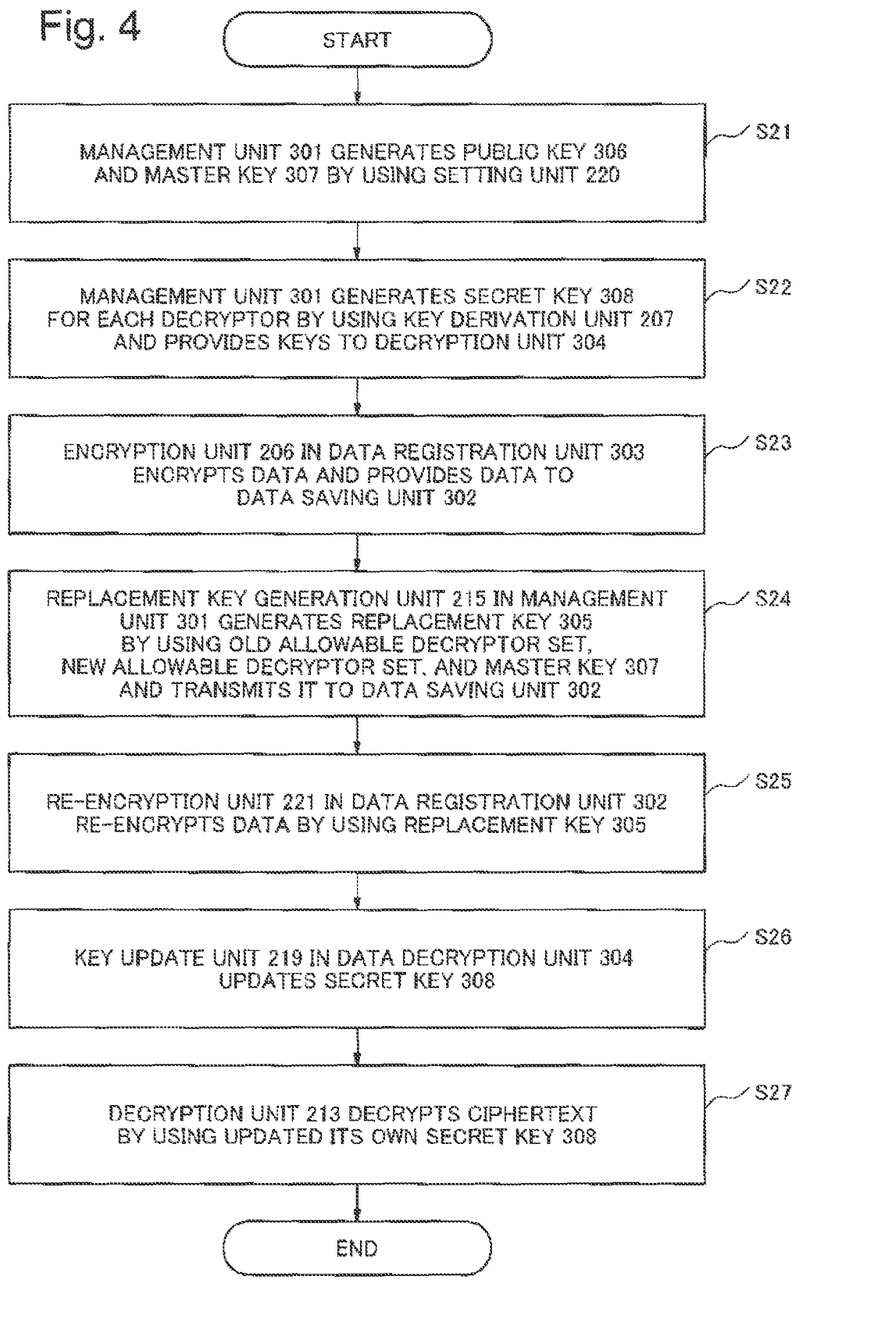
FIG. 4 is a flowchart illustrating an example of an operation of the third exemplary embodiment of the re-encryption system according to the present invention.

Next, an operation of the re-encryption system of the third exemplary embodiment described below. FIG. 4 is a flowchart illustrating an example of the operation of the third exemplary embodiment of the re-encryption system of the present invention. In addition, order of operations of the re-encryption system of the third exemplary embodiment is not limited to the following order.

The management unit 301, by using the setting unit 220, generates the public key 306 and the master key 307 (step S21). The management unit 301 generates the secret key 308 for each decryptor by using the key derivation unit 207 and provides the data decryption unit 304 with the secret key (step S22).

An operation in a case in which a data registrar entrusts a data saver with the save of data 309 is described. The encryption unit 206 in the data registration unit 303 encrypts the data and provides the data saving unit 302 with the encrypted data (step S23).

In case that the manager changes the allowable decryptor set, such as increases or decreases the number of allowable decryptors which are able to decrypt encrypted data, the replacement key generation unit 215 in the management unit 301, by using the old allowable decryptor set S, the new allowable decryptor set S', and the master key 307, generates a replacement key 305 (rk(S, S')) and transmits the replacement key to the data saving unit 302 (step S24).

The re-encryption unit 221 in the data saving unit 302 receives the replacement key 305 (rk(S, S')), the re-encryption unit 221 re-encrypts each ciphertext encrypted by use of the saved old allowable decryptor set S and replaces the old ciphertext with the obtained new ciphertext (step S25).

An operation in a case in which a decryptor intends to fetch data saved in the data saving unit 302 is described. First, the decryptor accesses the data saving unit 302 and updates the secret key 308 by using the key update unit 219 in the data decryption unit 304 (step S26). Next, the decryptor fetches intended ciphertext data, and, if the decryptor itself belongs to the allowable decryptor set to which the ciphertext relates, decrypts the ciphertext through the decryption unit 213 by using the updated secret key 308 of the decryptor itself (step S27).

As described above, in case that an organization intends to use a data storage service provided outside such as on a cloud or the like, the re-encryption system of the third exemplary embodiment saves data after encrypting the data. Therefore, the re-encryption system of the third exemplary embodiment makes it possible to easily reduce a risk that the organization fears leakage of data from the service or a risk that a manager of the service accesses the data.

In particular, the re-encryption system of the third exemplary embodiment, in case that, for example, members of a company or the like are changed, makes it possible to apply access control to data for the changed members by changing a set of persons who can decrypt data. Access control in many data storage services is required to be able to change access rights. The re-encryption system of the third exemplary embodiment is able to deal with such a requirement by using access control based on encryption. The access control based on encryption is a powerful method for data protection in the sense that it is not necessary to worry about a risk that a data saver sneaks a look at data. The re-encryption system of the third exemplary embodiment makes it possible to easily change access rights. Therefore, by using the re-encryption system of the third exemplary embodiment, it is possible to enlarge the range of application targets of the access control based on encryption.

Figure 5:
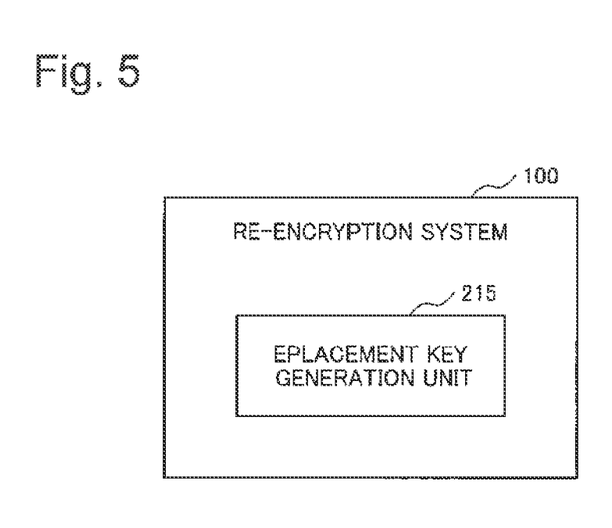
FIG. 5 is a block diagram illustrating a main configuration of the re-encryption system according to the present invention.

FIG. 5 is a block diagram illustrating a main configuration in the re-encryption system according to the present invention. As illustrated in FIG. 5, the re-encryption system 100 according to the present invention is characterized by including, as a main configuration, the replacement key generation unit 215. The replacement key generation unit 215 configures to receive the master key owned by a manager, the allowable decryptor set before change and the allowable decryptor set after change, generate the replacement key to convert the ciphertext which can be decrypted with the secret key of the decryptor belonging to the allowable decryptor set before change to the new ciphertext which can be decrypted with the secret key of the decryptor belonging to the allowable decryptor set after change, and output the generated replacement key.

In each of the above-described exemplary embodiments, the re-encryption systems described in the following supplementary notes (1) to (4) are also disclosed.

(1) A re-encryption system including a replacement key generation unit (for example, replacement key generation unit 215) that receives a master key owned by a manager (for example, the master key 205), an allowable decryptor set before change (for example, the allowable decryptor set 203), and an allowable decryptor set after change (for example, the new allowable decryptor set 210), and generates and outputs a replacement key (for example, the replacement key 216) to convert a ciphertext which can be decrypted with a secret key of a decryptor belonging to the allowable decryptor set before change (for example, the ciphertext 209) to a ciphertext which can be decrypted with a secret key of a decryptor belonging to the allowable decryptor set after change (for example, the ciphertext 222).

(2) The re-encryption system may include a re-encryption unit (for example, the re-encryption unit 221) that receives a ciphertext which can be decrypted with a secret key of a decryptor belonging to the allowable decryptor set before change and a replacement key, and generates and outputs a ciphertext which can be decrypted with a secret key of a decryptor belonging to the allowable decryptor set after change.

(3) The re-encryption system may include a key update unit (for example, the key update unit 219) that receives an identifier of a decryptor, at least a part of update information (for example, the update information 217) obtained by the generation of a replacement key, and a secret key of the decryptor identified by the identifier and outputs a new secret key of the decryptor identified by the identifier, wherein the update information includes information on an update of a public key, the secret key can decrypt a ciphertext encrypted with an old public key by specifying an allowable decryptor set including the identifier of the decryptor, and the new secret key can decrypt a ciphertext generated by using a new public key by specifying an allowable decryptor set including the identifier of the decryptor.

(4) The re-encryption system may include a management unit (for example, the management unit 301) that includes a key derivation unit configured to receives a decryptor identifier, a master key, and a public key and generates a decryptor secret key and a replacement key generation unit configured to generate a replacement key, and a data saving unit (for example, the data saving unit 302) that includes a transmission and reception unit configured to transmit and receive data (for example, the transmission and reception unit 321) and a re-encryption unit (for example, the re-encryption unit 221) and saves a ciphertext encrypted and registered by a data registrar and transmits the ciphertext in response to a request, wherein the management unit transmits the replacement key generated by the replacement key generation unit to the data saving unit, and the data saving unit receives the replacement key, the re-encryption unit re-encrypts the saved ciphertext, and the saved ciphertext is replaced with the re-encrypted ciphertext.

This application is based upon and claims the benefit of priority from Japanese patent application No. 2012-189548, filed on Aug. 30, 2012, the disclosure of which is incorporated herein in its entirety by reference.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention can be applied to a data storage service using a cloud or the like.

REFERENCE SIGNS LIST

206 Encryption unit
207 Key derivation unit
213 Decryption unit
215 Replacement key generation unit
219 Key update unit
220 Setting unit
221 Re-encryption unit 301 Management unit
302 Data saving unit
303 Data registration unit
304 Data decryption unit
321 Transmission and reception unit
322 Ciphertext storage unit

The invention claimed is:

1. A re-encryption system comprising:
a replacement key generation unit configured to:
   receive a master key owned by a manager, an allowable decryptor set before change, and an allowable decryptor set after change,
   generate and output a replacement key to convert a ciphertext which can be decrypted with a secret key of a decryptor belonging to the allowable decryptor set before change to a ciphertext which can be decrypted with a secret key of a decryptor belonging to the allowable decryptor set after change, and
   generate a new master key and update information used in generation of the secret key of the decryptor belonging to the allowable decryptor set after change.

2. The re-encryption system according to claim 1, further comprising
a re-encryption unit that receives the ciphertext which can be decrypted with the secret key of the decryptor belonging to the allowable decryptor set before change and the replacement key, and generates and outputs a ciphertext which can be decrypted with the secret key of the decryptor belonging to the allowable decryptor set after change.

3. The re-encryption system according to claim 1, further comprising
a key update unit that receives an identifier of the decryptor, at least a part of the update information obtained by generating the replacement key, and the secret key of the decryptor identified by the identifier, and outputs the new secret key of the decryptor identified by the identifier,
wherein the update information includes information on an update of a public key,
the secret key can decrypt the ciphertext generated by use of an old public key by specifying the allowable decryptor set including the identifier of the decryptor, and
the new secret key can decrypt the ciphertext generated by use of a new public key by specifying the allowable decryptor set including the identifier of the decryptor.

4. The re-encryption system according to claim 2, further comprising:
a management unit that includes
   a key derivation unit configured to receive the identifier of the decryptor, the master key, and a public key and generate a decryptor secret key, and
   a replacement key generation unit configured to generate the replacement key; and
a data saving unit that includes
   a transmission and reception unit configured to transmit and receive data, and
   a re-encryption unit,
saves the ciphertext encrypted and registered by a data registrar and transmits the ciphertext in response to a request,
wherein the management unit transmits the replacement key generated by the replacement key generation unit to the data saving unit, and
the data saving unit receives the replacement key, re-encrypts the saved ciphertext by using the re-encryption unit, and replaces the ciphertext with the re-encrypted ciphertext.

5. A re-encryption method comprising:
in a computer,
receiving a master key owned by a manager, an allowable decryptor set before change, and an allowable decryptor set after change;
generating and outputting a replacement key to convert a ciphertext which can be decrypted with a secret key of a decryptor belonging to the allowable decryptor set before change to a new ciphertext which can be decrypted with a secret key of a decryptor belonging to the allowable decryptor set after change;
generating a new master key and update information used in generation of the secret key of the decryptor belonging to the allowable decryptor set after change.

6. A non-transitory computer readable storage medium that stores a re-encryption program, the re-encryption program causing a computer to execute:
processing to receive a master key owned by a manager, an allowable decryptor set before change, and an allowable decryptor set after change;
processing to generate and output a replacement key to convert a ciphertext which can be decrypted with a secret key of a decryptor belonging to the allowable decryptor set before change to a new ciphertext which can be decrypted with a secret key of a decryptor belonging to the allowable decryptor set after change, and generating a new master key and update information used in generation of the secret key of the decryptor belonging to the allowable decryptor set after change.

7. A re-encryption system comprising:
replacement key generation means for receiving a master key owned by a manager, an allowable decryptor set before change, and an allowable decryptor set after change, and generating and outputting a replacement key to convert a ciphertext which can be decrypted with a secret key of a decryptor belonging to the allowable decryptor set before change to a ciphertext which can be decrypted with a secret key of a decryptor belonging to the allowable decryptor set after change, and generating a new master key and update information used in generation of the secret key of the decryptor belonging to the allowable decryptor set after change.

* * * * *

UNITED STATES PATENT AND TRADEMARK OFFICE
CERTIFICATE OF CORRECTION

PATENT NO. : 9,455,828 B2
APPLICATION NO. : 14/421223
DATED : September 27, 2016
INVENTOR(S) : Jun Furukawa It is certified that error appears in the above-identified patent and that said Letters Patent is hereby corrected as shown below:

In the Specification

Column 4, Line 61: Delete "$(G[i])_{1=1,\ldots,L},$" and insert --$(G[i])_{i=1,\ldots,L},$--

Column 5, Line 59: Delete "$e(\tau G, \alpha^k \gamma G[k] +$" and insert --$e(\tau G, \alpha^k \gamma G +$--

Column 6, Line 19: Delete "$= e(\tau \alpha^k G, \gamma' G[k] +$" and insert --$= e(\tau \alpha^k G, \gamma' G +$--

Column 8, Line 16: Delete "$(pk'=F=(F'[b])_{b=1,2},$" and insert --$(pk'=F'=(F'[b])_{b=1,2},$--

Column 9, Line 13: Delete "$\sum_{i \in \{k\}} G[b, L+1-i+k]))$" and insert --$\sum_{i \in S\setminus\{k\}} G[b, L+1-i+k]))$--

Signed and Sealed this
Twenty-ninth Day of August, 2017

Joseph Matal
*Performing the Functions and Duties of the
Under Secretary of Commerce for Intellectual Property and
Director of the United States Patent and Trademark Office*